(12) United States Patent
Mizusawa

(10) Patent No.: US 8,804,673 B2
(45) Date of Patent: Aug. 12, 2014

(54) RADIO COMMUNICATION DEVICE, COMMUNICATION CONTROL DEVICE, RADIO COMMUNICATION SYSTEM, RADIO COMMUNICATION METHOD, AND COMMUNICATION CONTROL METHOD

(75) Inventor: Nishiki Mizusawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 764 days.

(21) Appl. No.: 12/757,689

(22) Filed: Apr. 9, 2010

(65) Prior Publication Data

US 2010/0309889 A1 Dec. 9, 2010

(30) Foreign Application Priority Data

Jun. 8, 2009 (JP) ................ P2009-137370

(51) Int. Cl.
*H04J 3/00* (2006.01)
(52) U.S. Cl.
USPC .......................................... 370/336; 370/337
(58) Field of Classification Search
USPC ................................................. 370/310–350
See application file for complete search history.

(56) References Cited

U.S. PATENT DOCUMENTS

| | | | |
|---|---|---|---|
| 7,110,781 B1 * | 9/2006 | Hulbert et al. ................ | 455/502 |
| 8,483,616 B1 * | 7/2013 | Hall ............................. | 455/63.1 |
| 2001/0014588 A1 * | 8/2001 | Ishida ........................... | 455/69 |
| 2003/0152059 A1 * | 8/2003 | Odman ......................... | 370/338 |
| 2003/0176198 A1 * | 9/2003 | Chisholm ..................... | 455/463 |
| 2003/0198246 A1 * | 10/2003 | Lifshitz et al. ............... | 370/445 |
| 2006/0294217 A1 * | 12/2006 | Chambers ..................... | 709/223 |
| 2007/0047495 A1 * | 3/2007 | Ji et al. ......................... | 370/335 |
| 2008/0318527 A1 * | 12/2008 | Higuchi et al. ................ | 455/42 |
| 2011/0268278 A1 * | 11/2011 | Barkan ......................... | 380/270 |

FOREIGN PATENT DOCUMENTS

| | | |
|---|---|---|
| CN | 1312661 | 9/2001 |
| JP | 06-177811 | 6/1994 |
| JP | 08-102785 | 4/1996 |
| JP | 09-083430 | 3/1997 |
| JP | 2002-204263 | 7/2002 |
| JP | 2005-223447 | 8/2005 |
| WO | WO 2008/109866 | 9/2008 |

OTHER PUBLICATIONS

Translation of Chinese Office Action in related Chinese Application No. 201010193340.2, issued on Sep. 29, 2013, 16 pages.

* cited by examiner

*Primary Examiner* — Andrew Chriss
*Assistant Examiner* — Kenan Cehic
(74) *Attorney, Agent, or Firm* — Finnegan, Henderson, Farabow, Garrett & Dunner, LLP

(57) ABSTRACT

There is provided a radio communication device including a communication unit that communicates with a base station by using a given radio multiplexing architecture, a storage unit that stores time slot information, and a control unit that controls the communication unit to communicate with the base station by using the given radio multiplexing architecture in a time slot indicated by the time slot information.

8 Claims, 9 Drawing Sheets

| GROUP1 | | | | | | |
|---|---|---|---|---|---|---|
| TERMINAL ID | A | B | C | ... | ... | ... |
| ALLOCATED TIME | t1t2 | t2t3 | t3t4 | ... | ... | ... |

| GROUP2 | | | | | | |
|---|---|---|---|---|---|---|
| TERMINAL ID | E | F | G | H | ... | ... |
| ALLOCATED TIME | t1t5 | t5t6 | t6t7 | t7t8 | ... | ... |

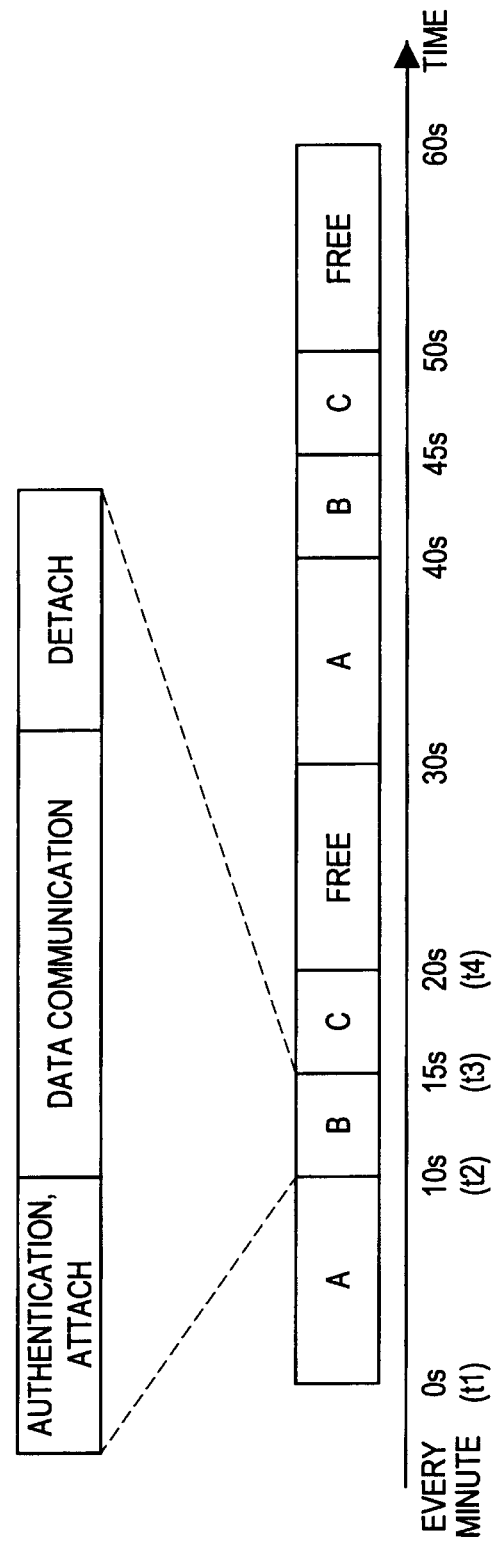

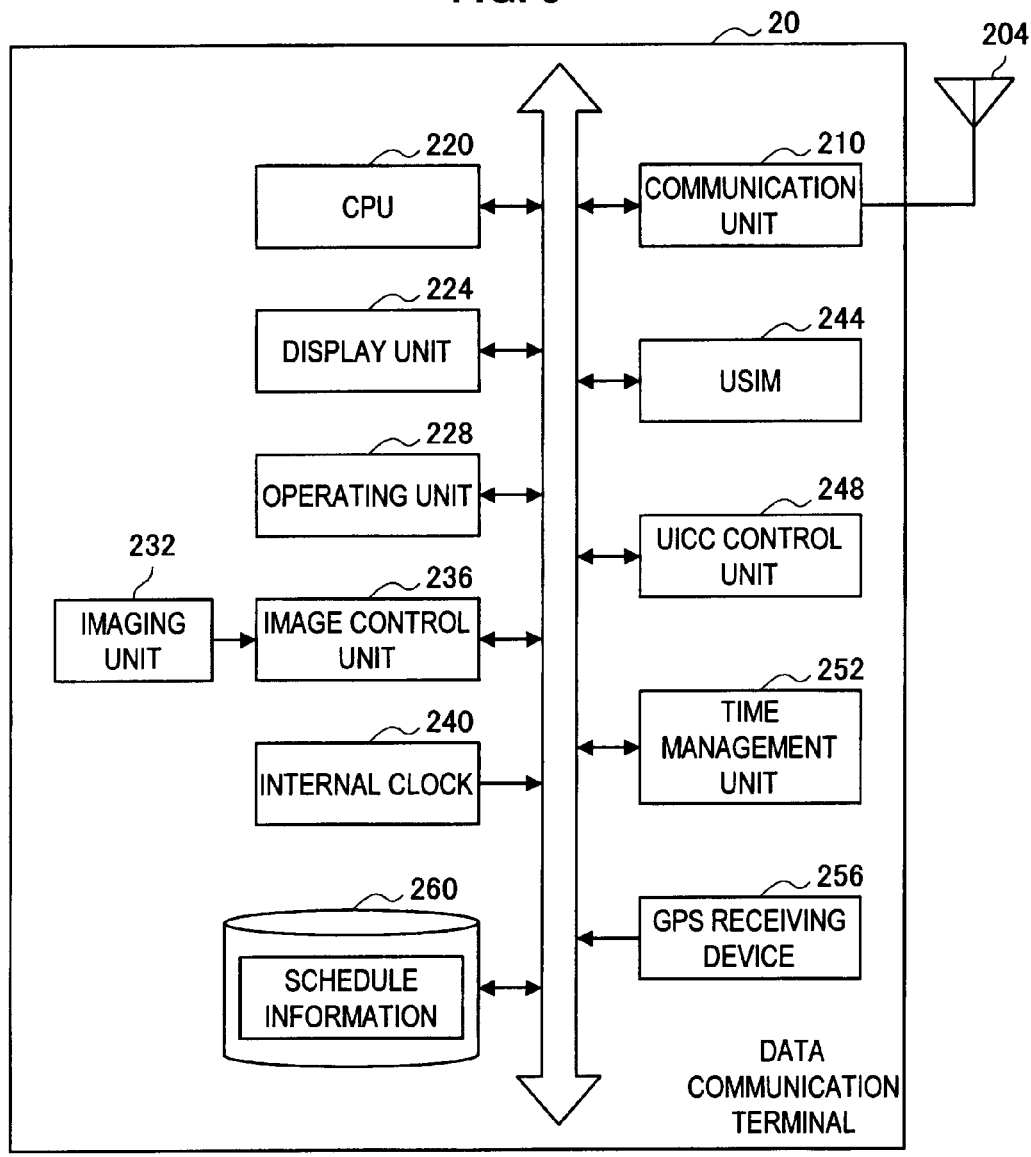

FIG. 9
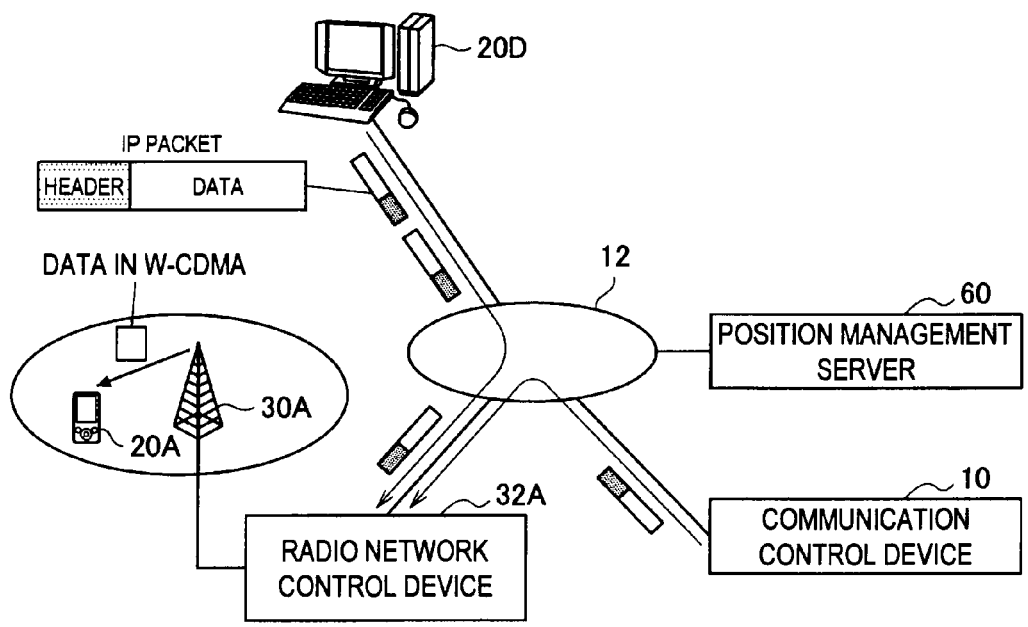
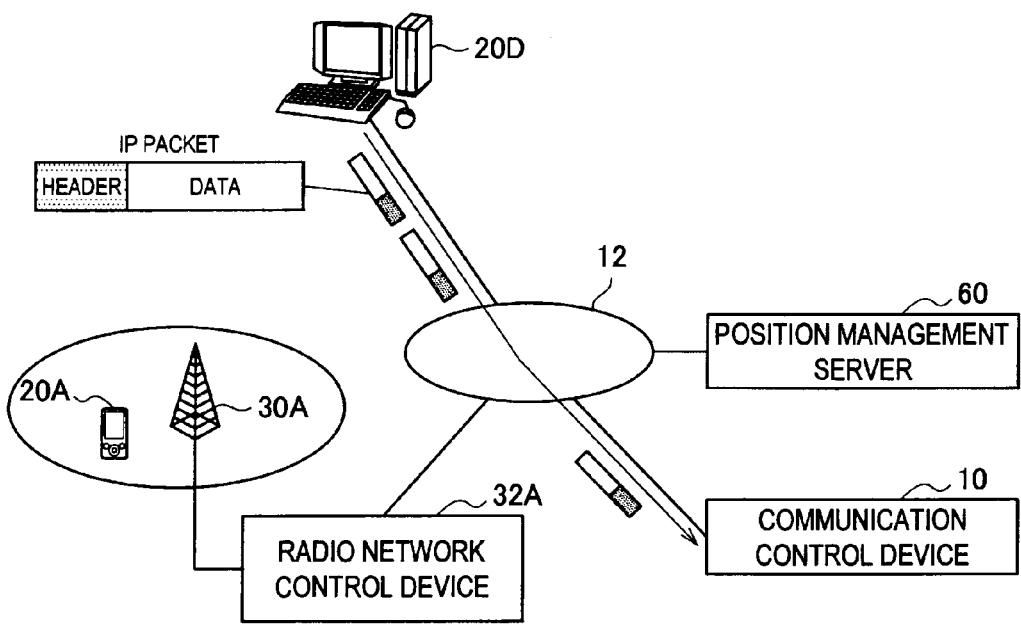

RADIO COMMUNICATION DEVICE, COMMUNICATION CONTROL DEVICE, RADIO COMMUNICATION SYSTEM, RADIO COMMUNICATION METHOD, AND COMMUNICATION CONTROL METHOD

BACKGROUND OF THE INVENTION

1. Field of the Invention

The present invention relates to a radio communication device, a communication control device, a radio communication system, a radio communication method, and a communication control method.

2. Description of the Related Art

A mobile phone system having a hierarchical cell structure (HCS) has been used. The hierarchical cell structure involves a high-powered base station (macro cell) with a wide coverage and a low-powered base station (micro cell) with a narrow coverage. The high-powered base station is installed in every certain area, for example, and the low-powered base station is installed in a place where radio waves are difficult to reach (e.g. inside a particular building) within the coverage of the high-powered base station.

Further, the sophistication of the mobile phone system is in progress today. For example, HSPA (High Speed Packet Access) having a higher maximum communication speed than W-CDMA (Wideband Code Division Multiple Access) is already put into practical use, and, moreover, the practical use of LTE (Long Term Evolution) compatible with even higher-speed communication is under discussion.

Under such circumstances, it is necessary to install an indoor small low-powered base station (femtocell; its specifications are standardized and already in practical use abroad) with a narrower coverage than the micro cell in close proximity to a user in need of high-speed communication for the following reasons.

(1) For a higher effective communication speed in each terminal, an environment with a high signal-to-noise ratio, namely, a communication environment in which the distance between a base station and a terminal is short is desirable.

(2) For a wider coverage of a mobile phone carrier and greater user capacity, installing an additional low-cost small low-powered base station exhibits better investment efficiency for a carrier than installing an additional macro cell base station.

(3) By allowing the traffic of high-speed data communication by indoor users to flow out from a femtocell to a broadband network such as DSL, the processing load of a carrier's core network can be reduced.

(4) By awarding the advantage of a carrier gained by use of a femtocell to users, a business model that reduces communication fees charged to users becomes feasible.

Japanese Unexamined Patent Application Publication No. 2005-223447 discloses a system for avoiding the situation where a terminal which enters a service is unable to receive the service due to the shortage of a resource because of the concentration of position registration to a particular base station. In this system, a base station counts the number of terminals for which position registration is made and, based on the count result, transmits annunciation information indicating that excessive position registration is occurring to a terminal in the area. Based on the received annunciation information, the terminal selects a macro cell when the cell state is under excessive position registration.

SUMMARY OF THE INVENTION

Recently, a wide variety of data communication terminals and home electronic appliances having a communication function have been used, and it is expected that the case where one user uses a plurality of terminals at the same time will widespread. In this case, because the service qualities of the macro cell and the femtocell are not equal as described in the above (1) to (4), it is more advantages for both a user and a carrier to perform communication with use of the femtocell as much as possible. Therefore, there is a problem in the system disclosed in Japanese Unexamined Patent Application Publication No. 2005-223447 in which a new terminal makes position registration to the macro cell when excessive terminals are already used in the femtocell.

However, if a plurality of terminals used by a user are unconditionally connected to an indoor low-powered base station such as the femtocell, the possibility that resource shortage occurs becomes higher as the number of terminals increases. For example, when performing data communication between a plurality of terminals (one-to-one or one-to-many) registered to the same cell, a resource request for several terminals to be used are concurrently made to one cell, which increases the probability of resource shortage.

In light of the foregoing, it is desirable to provide a novel and improved radio communication device, communication control device, radio communication system, radio communication method and communication control method that enable reduction of the occurrence of resource shortage.

According to an embodiment of the present invention, there is provided a radio communication device including, a communication unit that communicates with a base station by using a given radio multiplexing architecture, a storage unit that stores time slot information, and a control unit that controls the communication unit to communicate with the base station by using the given radio multiplexing architecture in a time slot indicated by the time slot information.

The time slot indicated by the time slot information may be one of time slots respectively allocated to a plurality of radio communication devices without overlap in a periodically repeated time frame.

Communication between the communication unit and the base station in the time slot indicated by the time slot information may include position registration and position registration cancellation of the radio communication device to the base station.

The communication unit may communicate with an unspecified base station in the time slot indicated by the time slot information. The time slot information may be set by a user.

According to another embodiment of the present invention, there is provided a communication control device including, a communication unit that communicates with a base station that communicates with a radio communication device by using a given radio multiplexing architecture, a storage unit that stores time slot information in association with each identification information of a plurality of radio communication devices, and a control unit that controls the communication unit to transmit data addressed to the radio communication device to the radio communication device through the base station in a time slot indicated by time slot information associated with the radio communication device.

The plurality of radio communication devices may belong to any of one or more than one groups, and the time slot indicated by time slot information associated with each radio communication device belonging to the same group may be one of time slots respectively allocated to radio communication devices belonging to the same group without overlap in a periodically repeated time frame.

The control unit may increase a time slot allocated to a radio communication device with an increased communication volume.

The storage unit may temporarily stores data addressed to the radio communication device and transmitted outside the time slot indicated by time slot information associated with the radio communication device. The control unit may set the time slot information in response to user operation.

According to another embodiment of the present invention, there is provided a radio communication system including, a radio communication device including a first communication unit that communicates with a base station by using a given radio multiplexing architecture, a first storage unit that stores time slot information, and a first control unit that controls the first communication unit to communicate with the base station by using the given radio multiplexing architecture in a time slot indicated by the time slot information, and a communication control device including a second communication unit that communicates with the base station, a second storage unit that stores time slot information in association with each identification information of a plurality of radio communication devices, and a second control unit that controls the second communication unit to transmit data addressed to the radio communication device to the radio communication device through the base station in a time slot indicated by time slot information associated with the radio communication device.

According to another embodiment of the present invention, there is provided a radio communication method including the step of communicating with a base station by using a given radio multiplexing architecture in a time slot indicated by time slot information stored in a storage medium.

According to another embodiment of the present invention, there is provided a communication control method including the step of transmitting data addressed to one radio communication device transmitted from another device to the radio communication device through a base station that communicates with the radio communication device by using a given radio multiplexing architecture in a time slot indicated by time slot information stored in a storage medium.

According to the embodiments of the present invention described above, it is possible to provide a radio communication device, a communication control device, a radio communication system, a radio communication method and a communication control method that enable reduction of the occurrence of resource shortage.

BRIEF DESCRIPTION OF THE DRAWINGS

FIG. 5 is an explanatory view schematically showing an allocated time period to each data communication terminal belonging to a group 1.

FIG. 6 is a functional block diagram showing a configuration of a data communication terminal.

FIG. 7 is an explanatory view showing an example of schedule information.

FIG. 9 is an explanatory view showing a flow of data addressed to a data communication terminal.

DETAILED DESCRIPTION OF THE EMBODIMENT(S)

Figure 1:
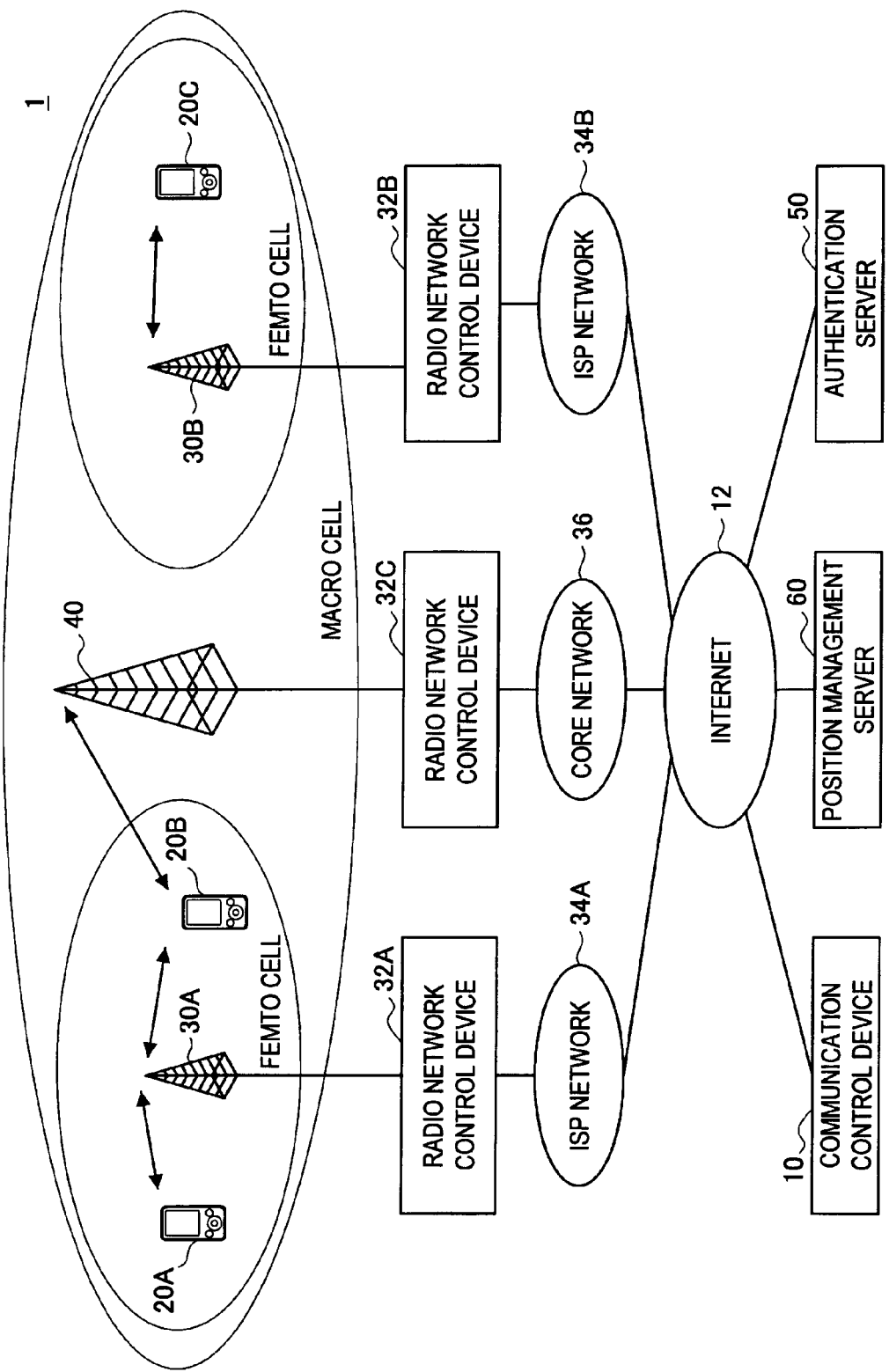
FIG. 1 is an explanatory view showing a configuration of a data communication system.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In this specification and the drawings, each of a plurality of structural elements having substantially the same function is distinguished by affixing a different alphabetical letter to the same reference numeral in some cases. For example, a plurality of structural elements having substantially the same function are distinguished like data communication terminals 20A, 20B and 20C where necessary. However, when there is no particular need to distinguish between a plurality of structural elements having the same function, they are denoted by the same reference numeral. For example, when there is no particular need to distinguish between the data communication terminals 20A, 20B and 20C, they are referred to simply as the data communication terminals 20.

Preferred embodiments of the present invention will be described hereinafter in the following order.

1. Configuration of Data Communication System
2. Background
3. Configuration of Communication Control Device
4. Configuration of Data Communication Terminal
5. Operation of Communication Control Device
6. Operation of Data Communication Terminal
7. Summary <1. Configuration of Data Communication System>

A configuration of a data communication system 1 according to an embodiment of the present invention is described hereinafter with reference to FIG. 1.

FIG. 1 is an explanatory view showing the configuration of the data communication system 1. Referring to FIG. 1, the data communication system 1 includes a communication control device 10, the Internet 12, data communication terminals 20A to 20C, femtocell base stations 30A and 30B, radio network control devices 32A to 32C, ISP (Internet Service Provider) networks 34A and 34B, a core network 36, a macro cell base station 40, an authentication server 50, and a position management server 60.

The macro cell base station 40 forms a macro cell with a wide coverage and communicates with the data communication terminal 20 in the macro cell. On the other hand, the femtocell base station 30 is installed in a place where radio waves from a high-powered base station are difficult to reach such as at home, for example, and forms a femtocell with a relatively narrow coverage. In the example shown in FIG. 1, the femtocell base stations 30A and 30B are installed inside the macro cell, so that the femtocells formed by the femtocell base stations 30A and 30B and the macro cell formed by the macro cell base station 40 overlap.

The macro cell base station 40 and the femtocell base stations 30A and 30B may be in conformity with TS25.104 specifications standardized by 3GPP (Third Generation Partnership Project). Specifically, the data communication terminal 20 and the macro cell base station 40 or the femtocell base station 30 are connected by a W-CDMA radio link. Thus, all the data communication terminals 20 in one cell perform communication by sharing the same frequency band and time, and each data communication terminal 20 is distinguished by a uniquely assigned spread code. The length of one radio frame in compliance with W-CDMA is 10 ms, and allocation of time to each data communication terminal 20, which is described later, is made at a time interval which is equal to or longer than the length of the radio frame (an integral multiple of two or greater).

It should be noted that communication between the data communication terminal 20 and the macro cell base station 40 or the femtocell base station 30 is not necessarily based on the above-described W-CDMA technology, and it may be based on other technologies. For example, FDMA (Frequency-Division Multiple Access) or TDMA (Time Division Multiple Access) may be employed. In the case of employing OFDMA or TDMA also, allocation of time to each data communication terminal 20, which is described later, is made at a time interval which is equal to or longer than the length of a radio frame specified by each communication technology.

The data communication terminal 20 can make position registration to a base station whose coverage includes the data communication terminal 20. For example, the data communication terminals 20A and 20B are included in the coverage of the femtocell base station 30A, and they can make position registration to the femtocell base station 30A. Although the data communication terminal 20B can communicate with the macro cell base station 40 also, a higher priority is given to position registration to the femtocell base station 30A because communication within the femtocell is expected to offer a higher communication speed and advantageous in terms of charge. On the other hand, the data communication terminal 20C is included in the coverage of the femtocell base station 30B, and it can make position registration to the femtocell base station 30B. Further, each data communication terminal 20 can perform communication by making position registration to an unspecified base station during an allocated time period, which is described later. For example, although the case where the data communication terminal 20A makes position registration to the femtocell base station 30A is shown in FIG. 1, the data communication terminal 20A can make position registration to the femtocell base station 30B if it is included in the coverage of the femtocell base station 30B.

Although the case where the data communication terminal 20 is a mobile terminal is shown in FIG. 1, the data communication terminal 20 is not limited to a mobile terminal. For example, the data communication terminal 20 may be an information processing device such as a PC (Personal Computer), a home video processing device (e.g. a DVD recorder, a videocassette recorder etc.), a PDA (Personal Digital Assistants), a home game machine, or an electrical household appliance. Further, the data communication terminal 20 may be an information processing device such as a cellular phone, a PHS (Personal Handyphone System), a portable music playback device, a portable video processing device, or a portable game machine.

The radio network control device 32 is connected to the macro cell base station 40 or the femtocell base station 30 and performs radio connection control, handover control or the like. Although the radio network control device 32 is shown as one functional block in FIG. 1, the functions of the radio network control device 32 are incorporated into a plurality of devices in a distributed manner in some cases in actual hardware.

Further, the radio network control device 32 for the macro cell base station 40 or the femtocell base station 30 is in conformity with IMS (IP Multimedia Subsystem). The radio network control devices 32A and 32B that are connected to the femtocell base stations 30 are connected to the ISP networks 34A and 34B, respectively, through a broadband line such as DSL and further connected to the authentication server 50, the position management server 60 and the communication control device 10 through the Internet 12.

The authentication server 50 performs ID management of users and the data communication terminals 20 and management of user subscriber information and authentication information. Further, the authentication server 50 authenticates the data communication terminal 20 in response to a request for position registration from the data communication terminal 20.

The position management server 60 manages information of the base station (30, 40) to which the data communication terminal 20 makes position registration and the radio network control device 32 with respect to each data communication terminal 20. When the position management server 60 receives an inquiry about position information of the data communication terminal 20, if the relevant data communication terminal 20 has made position registration, the position management server 60 sends back information of the base station (30, 40) to which position registration is made and the radio network control device 32. On the other hand, if the relevant data communication terminal 20 has not made position registration, the position management server 60 sends back information of the communication control device 10. Further, if the relevant data communication terminal 20 has not made position registration for a longer time period than a predetermined period, the position management server 60 sends back a status indicating that the data communication terminal 20 is not registered.

The communication control device 10 stores schedule information indicating an allocated time period to the data communication terminal 20 and makes control so that communication related to the data communication terminal 20 is performed during the allocated time period. The schedule information can be changed as appropriate by a user accessing the communication control device 10 through the Internet 12, for example. Note that the data communication terminal 20 checks whether a change is made to the schedule information stored in the communication control device 10 at the time of making position registration, and, if there is a change, acquires the changed schedule information from the communication control device 10 and stores it. As a result, the communication control device 10 and the data communication terminal 20 can share the latest schedule information. The detail of the schedule information and the detail of communication control made by the communication control device 10 are described later in the "3. Configuration of Communication Control Device" and "5. Operation of Communication Control Device".

<2. Background>

A background led to an embodiment of the present invention is described hereinbelow.

Figure 2:
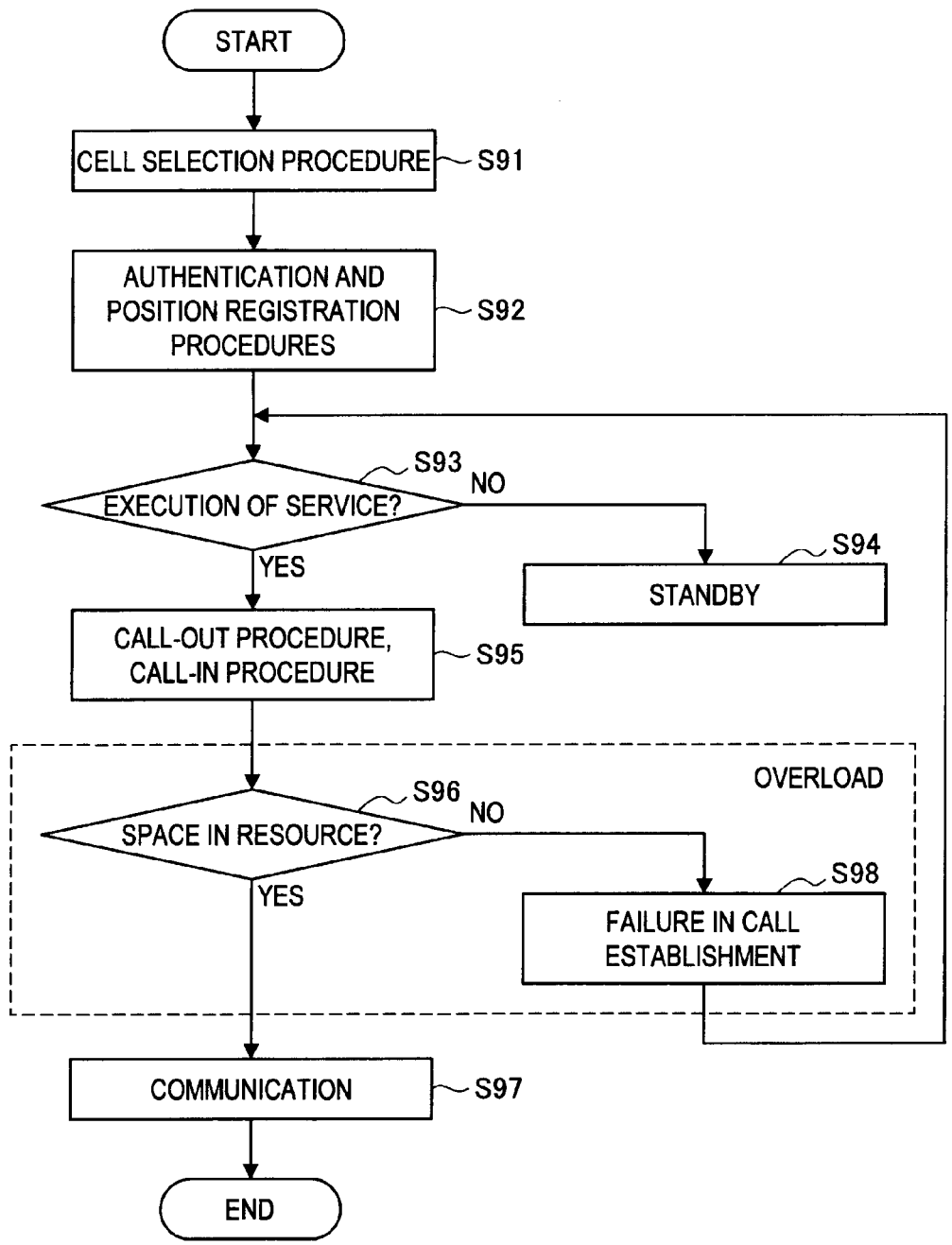
FIG. 2 is a flowchart showing a flow of a position registration process in a certain mobile phone system.

FIG. 2 is a flowchart showing a flow of a position registration process in a certain mobile phone system. First, after power-on, a data communication terminal used by a user performs a cell selection procedure for selecting a cell to perform communication (S91). Next, the data communication terminal makes position registration to a base station of the selected cell.

Then, the data communication terminal determines whether a data communication service is executed or not (S93), and if the service is not received at that time, it enters the stand-by mode (S94). On the other hand, if the data communication terminal determines that the data communication service is executed after position registration, it executes a procedure (call-out or call-in) in accordance with the service (S95).

Further, at the time of executing the call-out procedure or call-in procedure, the data communication terminal determines whether there is a free space in the resource provided by the base station to which position registration is made (S96), and if there is a space in the resource, a communication channel or the like is allocated, and communication is started (S97). If, on the other hand, there is no space, call establishment is failed (S98), and the process returns to determination about service execution in S93. The state where the process proceeds to S98 from S96 is when an overload is occurring, and such an event occurs frequently when mobile stations make position registration in a concentrated manner to a low-powered base station.

Further, recently, a high-speed communication environment has been well established, and a flat communication rate system that is not proportional to the amount of communication packets has been introduced by a telecommunications carrier. Accordingly, high-speed data communication terminals are widespread, and various services and large volume contents utilizing high-speed communication are widely used, which promotes propagation of the communication business.

Further, various terminals such as music terminals and video terminals having a communication function are now put into widespread use. Therefore, a user can realize various lifestyles by utilizing a high-speed communication environment with use of a plurality of different terminals according to need.

However, when one user uses a plurality of terminals, a total communication charge is expensive even if the frequency of use of each terminal is very low because a basic fee and a communication fee for the respective terminals used are charged under the current domestic charge system. As a result, the lifestyle that one user uses a plurality of terminals is not widespread, and it is difficult to achieve an increase in the number of terminals and the deployment of a new service.

For example, if a user uses one USIM (Universal Subscriber Identity Module) in common to a plurality of terminals and replaces USIM for use each time changing the terminal to use, a communication fee for only one terminal is charged. It is, however, inconvenient for a user to replace USIM each time changing the terminal to use.

Under such a background, the communication control device 10 and the data communication terminal 20 according to an embodiment of the present invention have been invented. With the communication control device 10 and the data communication terminal 20, a plurality of data communication terminals 20 perform communication with a base station in non-overlap time, thereby preventing the occurrence of resource shortage. The communication control device 10 and the data communication terminal 20 are described hereinafter in detail.

<3. Configuration of Communication Control Device>

Figures 3, 4:
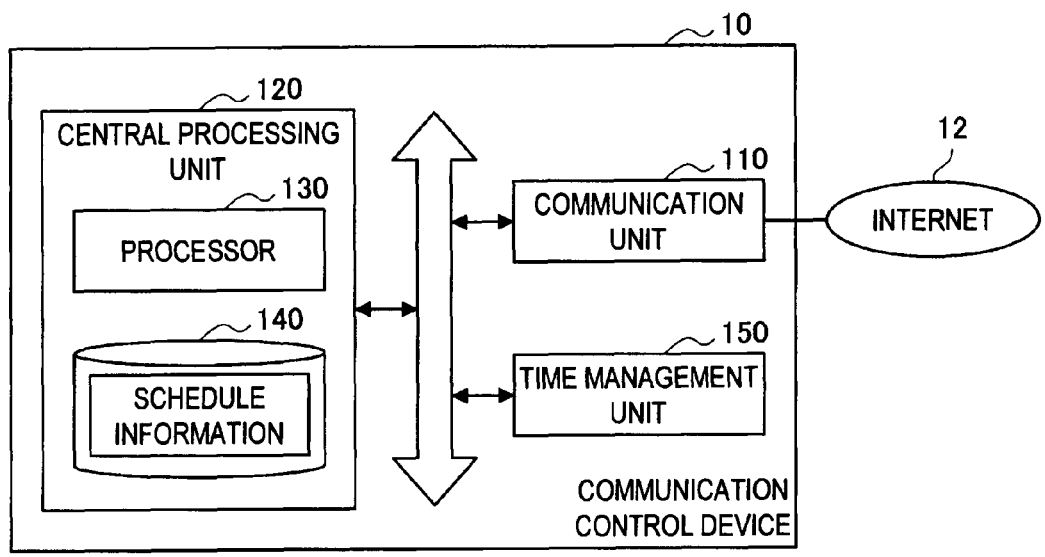
FIG. 3 is a functional block diagram showing a configuration of a communication control device.
FIG. 4 is an explanatory view showing an example of schedule information.

FIG. 3 is a functional block diagram showing a configuration of the communication control device 10. Referring to FIG. 3, the communication control device 10 includes a communication unit 110, a central processing unit 120 including a processor 130 and a storage unit 140, and a time management unit 150.

The communication unit 110 is connected to the Internet 12 and communicates with the femtocell base station 30, the macro cell base station 40, the data communication terminal 20, the position management server 60 or the like through the Internet 12.

The processor 130 functions as a control unit that controls the overall operation of the communication control device 10. The storage unit 140 stores schedule information (time slot information) indicating an allocated time period to each data communication terminal 20. The schedule information is described hereinafter with reference to FIG. 4.

FIG. 4 is an explanatory view showing an example of the schedule information. To be specific, FIG. 4 shows the schedule information of a group 1 that includes the data communication terminals 20A, 20B and 20C (the alphabetical letter attached to the reference numeral corresponds to a terminal ID) and a group 2 that includes data communication terminals 20E, 20F, 20G and 20H.

The schedule information of each group indicates an allocated time period to each data communication terminal 20 belonging to the group. Specifically, in the group 1, t1 to t2 is an allocated time period to the data communication terminal 20A, t2 to t3 is an allocated time period to the data communication terminal 20B, and t3 to t4 is an allocated time period to the data communication terminal 20C. Likewise, in the group 2, t1 to t5 is an allocated time period to the data communication terminal 20E, t5 to t6 is an allocated time period to the data communication terminal 20F, t6 to t7 is an allocated time period to the data communication terminal 20G, and t7 to t8 is an allocated time period to the data communication terminal 20H.

In this manner, in each group, the allocated time period is allocated to the respective data communication terminals 20 belonging to the group without overlap. The schedule information can be set by a user accessing the communication control device 10 from an arbitrary information processing device (which may be the data communication terminal 20) through the Internet 12, for example. Thus, a user can create a group, add the data communication terminal 20 to the group, eliminate the data communication terminal 20 from the group, set the allocated time period to the data communication terminal 20, change the allocated time period and so on by using an arbitrary information processing. The allocated time period is more specifically described hereinafter with reference to FIG. 5.

FIG. 5 is an explanatory view schematically showing the allocated time period to each data communication terminal 20 belonging to the group 1. Referring to FIG. 5, 0 s to 10 s and 30 s to 40 s in every minute are allocated to the data communication terminals 20A, 10 s to 15 s and 40 s to 45 s in every minute are allocated to the data communication terminals 20B, and 15 s to 20 s and 45 s to 50 s in every minute are allocated to the data communication terminals 20C. Further, 20 s to 30 s and 50 s to 60 s in every minute are free time periods. The free time periods may be used when adding the data communication terminal 20. Further, the processor 130 may allocate the free time period to any one of the data communication terminals 20A, 20B and 20C whose frequency of use becomes high.

Further, each data communication terminal 20 performs authentication, position registration (attach), data communication and cancellation of position registration (detach) within the allocated time period, as described in detail later. When data demanded by an application is too large to be transmitted within one allocated time period, each data communication terminal 20 transmits the remaining data to the next allocated time period. Note that the data communication terminal 20 estimates and stores end processing time necessary for a response from the network or detach, and ends the data communication by reserving the end processing time.

Further, when data addressed to a certain data communication terminal 20 is transmitted from the outside during time other than the allocated time period to the data communication terminal 20, the data is transferred to the communication control device 10 and temporarily stored in the storage unit 140. When the data addressed to the data communication terminal 20 is stored in the storage unit 140, the processor 130 makes an inquiry about position information of the data communication terminal 20 to the position management server 60 during the allocated time period to the data communication terminal 20 and transmits the data stored in the storage unit 140 from the communication unit 110 to the data communication terminal 20.

The storage unit 140 may be a storage medium such as nonvolatile memory, a magnetic disk, an optical disc or an MO (Magneto Optical) disk. Examples of the nonvolatile memory are EEPROM (Electrically Erasable Programmable Read-Only Memory), EPROM (Erasable Programmable ROM) and so on. Examples of the magnetic disk are a hard disk, a discoid magnetic disk and so on. Examples of the optical disc are CD (Compact Disc), DVD-R (Digital Versatile Disc Recordable), BD (Blu-ray Disc (registered trademark)) and so on.

The time management unit 150 acquires and manages time information. The time management unit 150 may acquire the time information by communicating with a server having an accurate master clock by using a protocol such as IEEE1588, for example. Further, in the case where the communication control device 10 includes a GPS receiving device that receives a GPS signal transmitted from an artificial satellite, the time management unit 150 may extract the time information from information acquired by the GPS receiving device. The time information is used for determination of the allocated time period by the processor 130.

<4. Configuration of Data Communication Terminal>

FIG. 6 is a functional block diagram showing a configuration of the data communication terminal 20. Referring to FIG. 6, the data communication terminal 20 includes an antenna 204, a communication unit 210, a CPU 220, a display unit 224, an operating unit 228, an imaging unit 232, an image control unit 236, an internal clock 240, an USIM 244, an UICC (Universal Integrated Circuit Card) control unit 248, a time management unit 252, a GPS receiving device 256, and a storage unit 260.

The communication unit 210 communicates with the femtocell base station 30 or the macro cell base station 40 through the antenna 204 by using a given radio multiplexing architecture. Specifically, based on control by the CPU 220, the communication unit 210 performs communication within the allocated time period to the data communication terminal 20 so as not to interfere with another terminal by using a given radio multiplexing architecture. While the communication unit 210 uses TDMA in the macro point of view because it performs communication within the allocated time period, it further performs communication by using a radio multiplexing architecture such as FDMA, CDMA or TDMA within the allocated time period.

The data communicated by the communication unit 210 may be music data such as music, a lecture or a radio program, video data such as a movie, a television program, a video program, a photograph, a document, a picture or a chart, a game, software or the like.

The CPU 220 is a control unit that controls the overall operation of the data communication terminal 20. For example, the CPU 220 controls the communication unit 210 to perform communication within the allocated time period indicated by the schedule information stored in the storage unit 260.

Further, the CPU 220 may access the communication control device 10 through the communication unit 210 at the time of position registration, check whether the schedule information stored in the storage unit 260 is the latest information or not, and if it is not the latest information, acquire the schedule information from the communication control device 10 and store it into the storage unit 260.

The display unit 224 displays still images, moving images, a user operation screen prompting user operation and so on. The display unit 224 may be an LCD (Liquid Crystal Display) device, an OLED (Organic Light Emitting Diode) device or the like, for example.

The operating unit 228 detects a user operation and outputs a signal corresponding to the detected user operation to the CPU 220. The operating unit 228 may be a mouse, a keyboard, a touch panel, a button, a microphone, a switch, or a lever, for example.

The imaging unit 232 acquires an image by imaging a subject, and the image control unit 236 controls the image acquired by the imaging unit 232. The image acquired by the imaging unit 232 may be transmitted from the communication unit 210.

The internal clock 240 generates a clock signal and updates the time information based on the count value of the clock signal. The time management unit 252 calibrates the time information obtained from the internal clock 240 by accurate time information obtained when the data communication terminal 20 makes position registration to the communication control device 10, thereby maintaining the accuracy of the time information of the data communication terminal 20.

Further, the time management unit 252 measures the time taken for each communication by the communication unit 210. For example, the time management unit 252 measures end processing time taken for detach by the communication unit 210, averages the end processing time, for example, and stores it into the storage unit 260. The time management unit 252 may acquire the time information from the GPS receiving device 256 that receives a GPS signal.

The storage unit 260 stores the schedule information indicating the allocated time period of communication to the data communication terminal 20. The schedule information shown in FIG. 7 by way of illustration indicates that t1 to t2 is the allocated time period to the data communication terminal 20, and the end processing time is te. Note that the allocated time period t1 to t2 may be time relative to the start time point of each time frame that is repeated periodically. For example, when the period of each time frame is 30 seconds, t1=0 second and t2=5th second, and the start time point of a certain time frame is 8:32:00 pm, 8:32:00 pm to 8:32:05 pm, 8:32:30 pm to 8:32:35 pm, . . . , are the allocated time periods to the data communication terminal 20.

The USIM (Universal Subscriber Identity Module) 244 is a module that stores user subscriber information, terminal ID, telephone number, host name or the like which are necessary for authentication, and it is incorporated into a physical IC card called UICC. USIM is in conformity with "3GPP TS31.102", and UICC is in conformity with "3GPP TS31.101".

The UICC control unit 248 controls supply of a power supply voltage to a power supply terminal, for example, among terminals mounted on the UICC. The CPU 220 enters the process of authentication and position registration (attach) upon UICC power-on, and cancels position registration (detach) upon UICC power-off. Thus, the UICC control unit

248 may supply a power to the UICC upon reaching the allocated time period indicated by the schedule information stored in the storage unit 260, and block a power to the UICC upon reaching the time ahead of the end time of the allocated time period by the length of the end processing time necessary for detach or the like.

<5. Operation of Communication Control Device>

An operation of the communication control device 10 is described hereinafter with reference to FIGS. 8 and 9.

Figure 8:
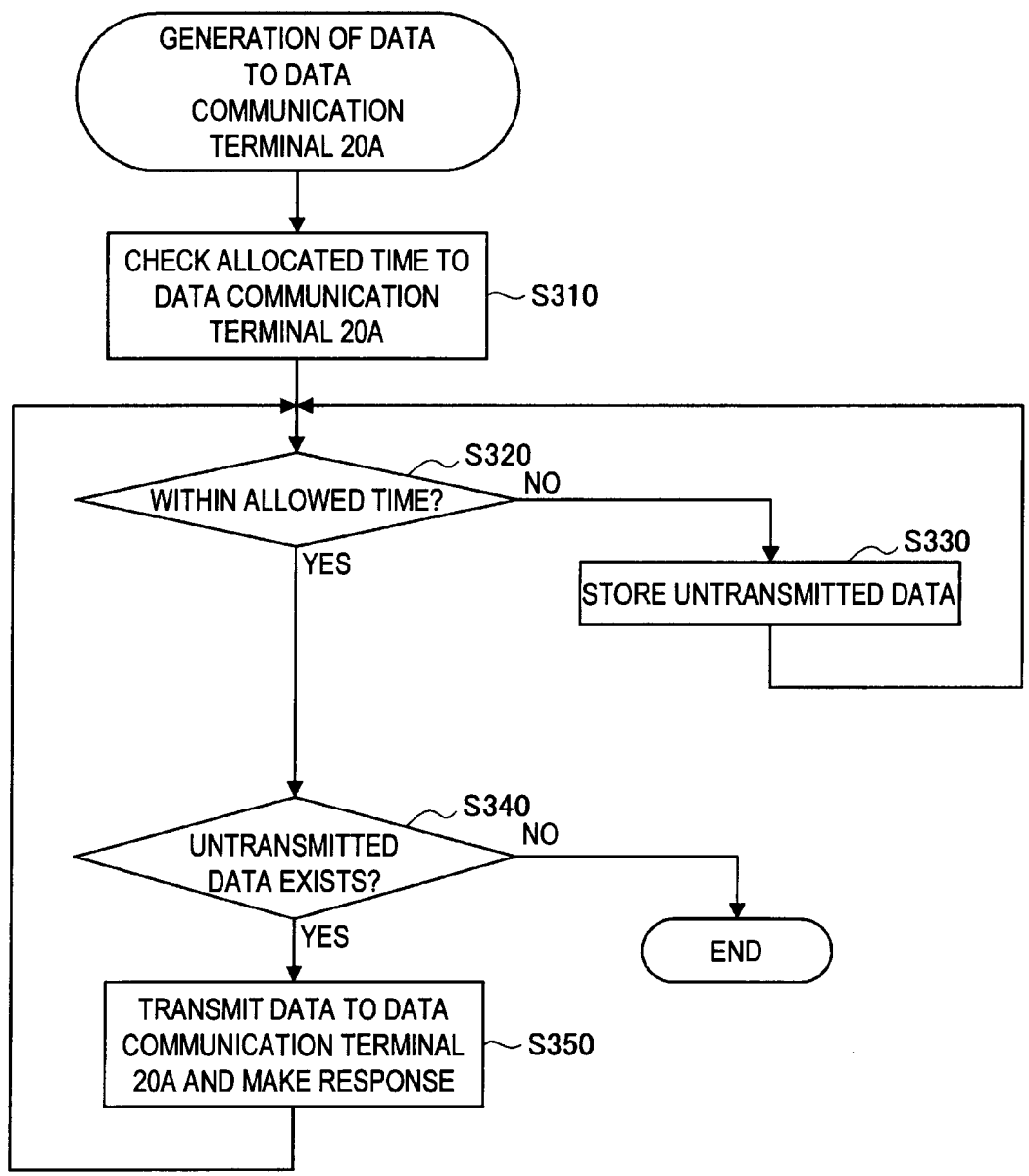
FIG. 8 is a flowchart showing a flow of an operation of a communication control device.

FIG. 8 is a flowchart showing a flow of an operation of the communication control device 10. As shown in FIG. 8, data to the data communication terminal 20A which is transmitted from an external terminal during time other than the allocated time period to the data communication terminal 20A is transferred to the communication control device 10.

After that, the processor 130 reads and checks the allocated time period to the data communication terminal 20A from the storage unit 140 (S310) and determines whether it is within allowed time (S320). The allowed time is a period in which the end processing time expected to be necessary for detach or the like is subtracted from the allocated time period to the data communication terminal 20A.

Then, if it is outside the allowed time, the processor 130 temporarily stores the data addressed to the data communication terminal 20A into the storage unit 140 (S330). On the other hand, if it is within the allowed time and untransmitted data addressed to the data communication terminal 20A is stored in the storage unit 140, the processor 130 transmits the untransmitted data to the data communication terminal 20A (S350). The communication control device 10 performs the processing of S320 to S350 until there becomes no untransmitted data and then ends the process when there becomes no untransmitted data.

A flow of data when the data communication terminal 20D transmits data addressed to the data communication terminal 20A is specifically described with reference to FIG. 9.

(1) Data Transmission by the Data Communication Terminal 20D

When the data communication terminal 20D transmits data whose destination is a terminal ID of the data communication terminal 20A, the data communication terminal 20D makes an inquiry about the position registration status of the data communication terminal 20A to the position management server 60 for IP address resolution.

When position registration information of the data communication terminal 20A is stored in the position management server 60 (when it is during the allocated time period to the data communication terminal 20A), the data communication terminal 20D obtains an address of the radio network control device 32A that controls the base station 30A to which the data communication terminal 20A makes position registration, writes the address of the radio network control device 32A as a header destination address and transmits the data as shown in the upper part of FIG. 9.

On the other hand, when position registration information of the data communication terminal 20A is not stored in the position management server 60 (when it is outside the allocated time period to the data communication terminal 20A), the data communication terminal 20D obtains an address of the communication control device 10 that manages the schedule of the data communication terminal 20A, writes the address of the communication control device 10 as a header destination address and transmits the data as shown in the lower part of FIG. 9. When the data communication terminal 20A has not made position registration for a time period longer than a certain period, the position management server 60 may refrain from notifying the address of the communication control device 10 to the data communication terminal 20D. This prevents a large volume of data from being transmitted to the communication control device 10 when the data communication terminal 20A has not made position registration for a long period of time.

(2) Data Transmission by the Communication Control Device 10

The communication control device 10 receives data addressed to the data communication terminal 20A which is transmitted from the data communication terminal 20D during time other than the allocated time period to the data communication terminal 20A and temporarily stores the data into the storage unit 140 as shown in the lower part of FIG. 9.

On the other hand, the communication control device 10 makes an inquiry about the position registration status of the data communication terminal 20A to the position management server 60 for IP address resolution during the allocated time period to the data communication terminal 20A as shown in the upper part of FIG. 9. Then, the communication control device 10 writes the address of the radio network control device 32A as a header destination address and transmits the data addressed to the data communication terminal 20A which is stored in the storage unit 140. Note that, when the communication control device 10 transmits the same data to a plurality of data communication terminals 20, it transmits the data temporarily stored in the storage unit 140 according to the allocated time period to each destination data communication terminal 20.

<6. Operation of Data Communication Terminal>

An operation of the data communication terminal 20 is described hereinafter with reference to FIGS. 10 and 11.

Figure 10:
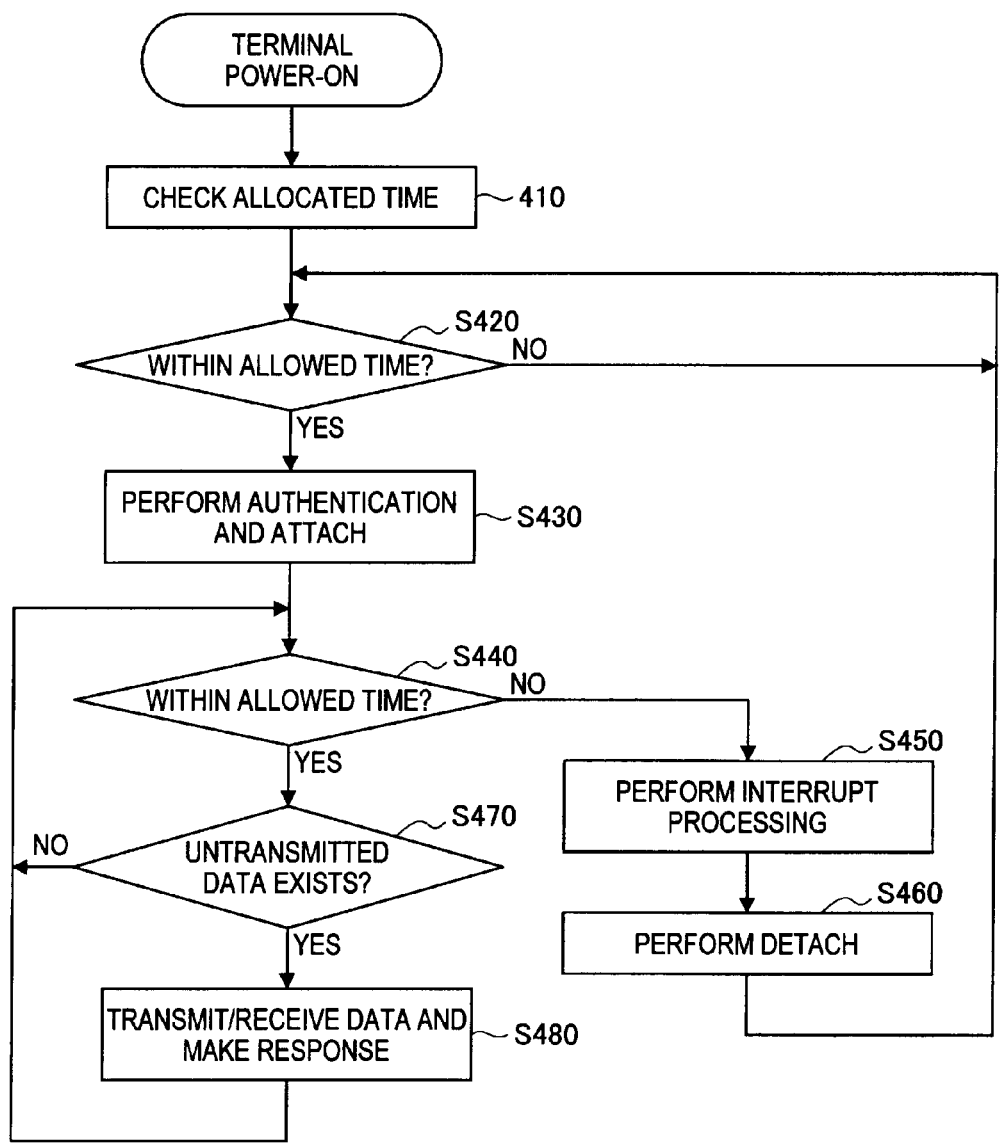
FIG. 10 is a flowchart showing a flow of a first operation example of a data communication terminal.

FIG. 10 is a flowchart showing a flow of a first operation example of the data communication terminal 20. Referring to FIG. 10, upon power-on, the CPU 220 of the data communication terminal 20 reads and checks the allocated time period indicated by the schedule information stored in the storage unit 260 (S410).

Then, the CPU 220 determines whether it is within the allowed time of communication (the period after subtracting the end processing time from the allocated time period) based on the time information managed by the time management unit 252 (S420). If it is within the allowed time, authentication and attach (S430) are performed on the base station of the selected cell, and the position information of the data communication terminal 20 is registered to the position management server 60. Further, the data communication terminal 20 accesses the communication control device 10 and checks the allocated time period to its own terminal. If it is different from the allocated time period stored in the storage unit 260, the data communication terminal 20 acquires the allocated time period to its own terminal from the communication control device 10 and stores it into the storage unit 260. Further, the data communication terminal 20 may also acquire time information from the communication control device 10 and calibrate the time information managed by the time management unit 252.

The CPU 220 further determines whether it is within the allowed time after the authentication and attach procedures (S440). If it is within the allowed time and there is untransmitted data (S470), the CPU 220 performs transmission and reception of the untransmitted data and response processing (S480), and the process returns to S440. The untransmitted data includes data that has not been transmitted and received in the previous data communication due to the limitation of the allowed time.

After that, when it becomes outside the allowed time, interrupt processing such as interruption of data communication by the CPU 220 and storage of status information (e.g. information indicating the presence or absence of untransmitted data) by the storage unit 260 is performed (S450). Further, the CPU 220 performs detach processing (S460) and, returning to S420, waits until reaching the allowed time again.

Hereinafter, a flow when the data communication terminal 20A performs data transmission is described more specifically.

(1) Transmission from the Data Communication Terminal 20A to Another Terminal (Terminal that does not Perform the Operation Based on the Allocated Time Period)

When the data communication terminal 20A transmits data whose destination is a terminal ID of another terminal, it performs IP address resolution. For example, if another terminal is a terminal of a mobile communication, the data communication terminal 20A makes an inquiry about the position registration status of that terminal to the position management server 60. On the other hand, if another terminal has a host name on the Internet, the data communication terminal 20A makes an inquiry about an IP address of that terminal to a DNS server. Then, the data communication terminal 20A writes an address obtained by the inquiry as a header destination address and transmits the data within the allocated time period to the data communication terminal 20A.

(2) Transmission from the Data Communication Terminal 20A to the Data Communication Terminal 20J When the data communication terminal 20A transmits data whose destination is a terminal ID of the data communication terminal 20J, the data communication terminal 20A makes an inquiry about the position registration status of the data communication terminal 20J to the position management server 60 for IP address resolution. When position registration information of the data communication terminal 20J is stored in the position management server 60 (when it is during the allocated time period to the data communication terminal 20J), the data communication terminal 20A obtains an address of the radio network control device 32J that controls the base station to which the data communication terminal 20J makes position registration, writes the address of the radio network control device 32J as a header destination address and transmits the data.

However, when the data communication terminal 20A and the data communication terminal 20J belong to the same group, for example, communication by the both terminals is not performed concurrently because position registration of the both terminals is made in different time slots. In this manner, when position registration information of the data communication terminal 20J is not stored in the position management server 60 (when it is outside the allocated time period to the data communication terminal 20J), the data communication terminal 20A obtains an address of the communication control device 10 that manages the schedule of the data communication terminal 20J, writes the address of the communication control device 10 as a header destination address and transmits the data.

A second operation example of the data communication terminal 20 is described hereinafter with reference to FIG. 11. The case where the data communication terminal 20 completes attach, data communication, and detach processing within the allocated time period is described above. However, in a communication system or a charge system having flexibility in management of the number of position registrations in the base stations, attach and detach are not necessarily completed within every allocated time period in some cases. In such a case, the second operation example of the data communication terminal 20 described below is effective.

Figure 11:
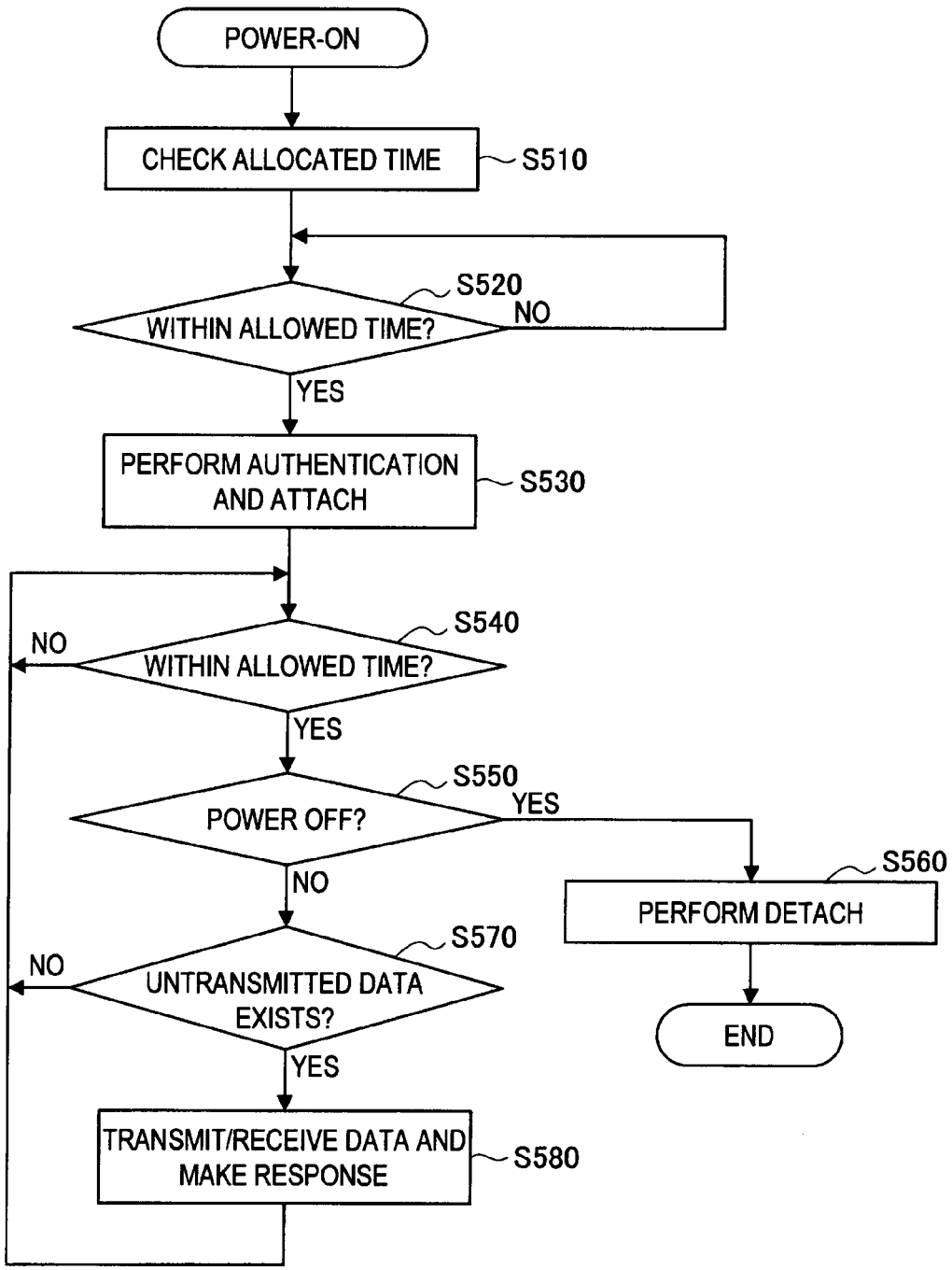
FIG. 11 is a flowchart showing a flow of a second operation example of a data communication terminal.

FIG. 11 is a flowchart showing a flow of the second operation example of the data communication terminal 20. Referring to FIG. 11, upon power-on, the CPU 220 of the data communication terminal 20 reads and checks the allocated time period indicated by the schedule information stored in the storage unit 260 (S510). Then, the CPU 220 determines whether it is within the allowed time of communication (the period after subtracting the end processing time from the allocated time period) based on the time information managed by the time management unit 252 (S520). If it is within the allowed time, authentication and attach (S530) are performed on the base station of the selected cell, and the position information of the data communication terminal 20 is registered to the position management server 60.

The CPU 220 further determines whether it is within the allowed time after the authentication and attach procedures (S540). If it is within the allowed time, power is not turned off, and there is untransmitted data (S570), the CPU 220 performs transmission and reception of the untransmitted data and response processing (S580), and the process returns to S540. After that, the data communication terminal 20 does not perform the detach even when it becomes outside the allowed time and performs the detach when the power is turned off (S550, S560).

Although the attach and detach processing is actually performed during handover also, FIG. 10 and FIG. 11 show the relationship between the allocated time period and the attach and detach processing, and the attach and detach processing during handover are is shown therein.

<7. Summary>

As described above, with the communication control device 10 and the data communication terminal 20, the allocated time period is allocated to a plurality of data communication terminals 20 belonging to the same group without overlap. It is thereby possible to prevent a plurality of data communication terminals 20 from simultaneously making a service request and thereby avoid the traffic peak. Further, because a communication resource for one user can be used in common to a plurality of data communication terminals 20, it can contribute to the reduction of a data communication charge.

It should be understood by those skilled in the art that various modifications, combinations, sub-combinations and alterations may occur depending on design requirements and other factors insofar as they are within the scope of the appended claims or the equivalents thereof.

Further, it is not always necessary to perform each step in the processing of the communication control device 10 or the data communication terminal 20 in this specification in chronological order according to the sequence shown in the sequence chart or the flowchart. For example, each step in the processing of the communication control device 10 or the data communication terminal 20 may include processing executed in parallel or individually (e.g. parallel processing or object processing).

Furthermore, it is possible to create a computer program that causes hardware such the processor 130 incorporated in the communication control device 10 or the CPU 220 incorporated in the data communication terminal 20 to perform the equal functions to each element of the communication control device 10 or the data communication terminal 20 described above. Further, a storage medium that stores such a computer program may be provided.

The present application contains subject matter related to that disclosed in Japanese Priority Patent Application JP 2009-137370 filed in the Japan Patent Office on Jun. 8, 2009, the entire content of which is hereby incorporated by reference.

What is claimed is:

1. A radio communication device comprising:
a communication unit that communicates with a base station by using a given radio multiplexing architecture and with a communication control device that stores time slot information respectively associated with each of a plurality of radio communication devices including the radio communication device;
a storage unit that stores the time slot information associated with the radio communication device; and
a control unit that controls the communication unit to receive data from the communication control device via the base station by using the given radio multiplexing architecture in a time slot indicated by the time slot information stored in the storage unit, the data having been addressed to the radio communication device, transmitted outside the time slot, and temporarily stored by the communication control device,
wherein the plurality of radio communication devices belong to any of one or more groups, and the indicated time slot is one of a plurality of time slots respectively allocated to a plurality of the radio communication devices belonging to a same group of the one or more groups without overlap in a periodically repeated time frame,
wherein communication between the communication unit and the base station in the indicated time slot includes position registration and position registration cancellation of the radio communication device to the base station, and
wherein the communication unit communicates with the communication control device in the indicated time slot.

2. The radio communication device according to claim 1, wherein the time slot information is set by a user.

3. A communication control device comprising:
a communication unit that communicates with a base station that communicates with a first radio communication device by using a given radio multiplexing architecture;
a storage unit that stores time slot information associated with identification information for each of a plurality of radio communication devices; and
a control unit that controls the communication unit to transmit data addressed to the first radio communication device through the base station in a time slot indicated by time slot information associated with the first radio communication device,
wherein the plurality of radio communication devices belong to any of one or more groups, and the time slot indicated by time slot information associated with each of the plurality of radio communication devices belonging to the same group is one of time slots respectively allocated to the plurality of radio communication devices belonging to the same group without overlap in a periodically repeated time frame, and
wherein the storage unit temporarily stores data addressed to the first radio communication device and transmitted outside the time slot indicated by time slot information associated with the first radio communication device.

4. The communication control device according to claim 3, wherein the control unit increases the time slot allocated to the first radio communication device with an increased communication volume.

5. The communication control device according to claim 3, wherein the control unit sets the time slot information in response to user operation.

6. A radio communication method comprising:
communicating with a base station that communicates with a first radio communication device by using a given radio multiplexing architecture;
storing time slot information associated with identification information for each of a plurality of radio communication devices;
temporarily storing data addressed to the first radio communication device and transmitted outside a time slot indicated by time slot information associated with the first radio communication device; and
controlling a communication unit to transmit the data through the base station in the indicated time slot,
wherein the plurality of radio communication devices belong to any of one or more groups, and the indicated time slot is one of a plurality of time slots respectively allocated to a plurality of the radio communication devices, belonging to a same group of the one or more groups without overlap in a periodically repeated time frame.

7. The method of claim 6, wherein the communicating with the base station further comprises position registration and position cancellation of the radio communication device.

8. The method of claim 6, wherein the time slot information is set by a user.

* * * * *